United States Patent [19]
do Espirito Santo

[11] Patent Number: 5,120,015
[45] Date of Patent: Jun. 9, 1992

[54] SUPPORT FOR AN EXTERNAL REARVIEW MIRROR FOR MOTOR VEHICLES

[75] Inventor: Antonio F. do Espirito Santo, Sao Bernardo do Campo, Brazil

[73] Assignee: Metagal Industria E Comercia Ltda., Sao Paulo, Brazil

[21] Appl. No.: 760,691

[22] Filed: Sep. 16, 1991

Related U.S. Application Data

[63] Continuation of Ser. No. 550,146, Jul. 6, 1990, abandoned.

[30] Foreign Application Priority Data

Dec. 11, 1989 [BR] Brazil .................................. 6902579

[51] Int. Cl.⁵ .............................................. B60R 1/00
[52] U.S. Cl. ...................................... 248/479; 359/871
[58] Field of Search ............. 248/479, 478, 477, 483, 248/486, 282.1, 549, 900, 282; 350/631, 632, 633, 634

[56] References Cited

U.S. PATENT DOCUMENTS

| | | | |
|---|---|---|---|
| 3,784,149 | 1/1974 | Brudy | 248/478 |
| 4,077,597 | 3/1978 | Greig | 248/477 |
| 4,135,694 | 1/1979 | Stegenga et al. | 248/478 |
| 4,186,905 | 2/1980 | Brudy | 248/478 |
| 4,613,215 | 9/1986 | Ayton | 248/478 X |
| 5,022,748 | 6/1991 | Espirito Santo | 248/486 X |
| 5,044,596 | 9/1991 | Espirito Santo | 248/900 X |

FOREIGN PATENT DOCUMENTS

| | | | |
|---|---|---|---|
| 1240429 | 5/1967 | Fed. Rep. of Germany | 248/900 |
| 2233825 | 1/1975 | France | 248/479 |
| 1154831 | 6/1969 | United Kingdom | 248/900 |
| 1489782 | 10/1977 | United Kingdom | 248/900 |

Primary Examiner—David M. Purol
Attorney, Agent, or Firm—Michael J. Striker

[57] ABSTRACT

A support for an external rear view mirror for motor vehicles comprises a support rod having an intermediate vertical portion for supporting the mirror and upper and lower transverse portions extending substantially horizontally from opposite ends of said vertical portion and first and second base elements connected with respective free ends of the upper and lower transverse portions for attaching the support to a vehicle body. One of the first and second base elements includes an arrangement for pivotally attaching a respective free end of one of the upper and lower transverse portions of the support rod with one base element and another one of the first and second base elements include an arrangement for fixedly attaching a respective free end of another one of the upper and lower transverse portions of the support rod to another base element.

2 Claims, 2 Drawing Sheets

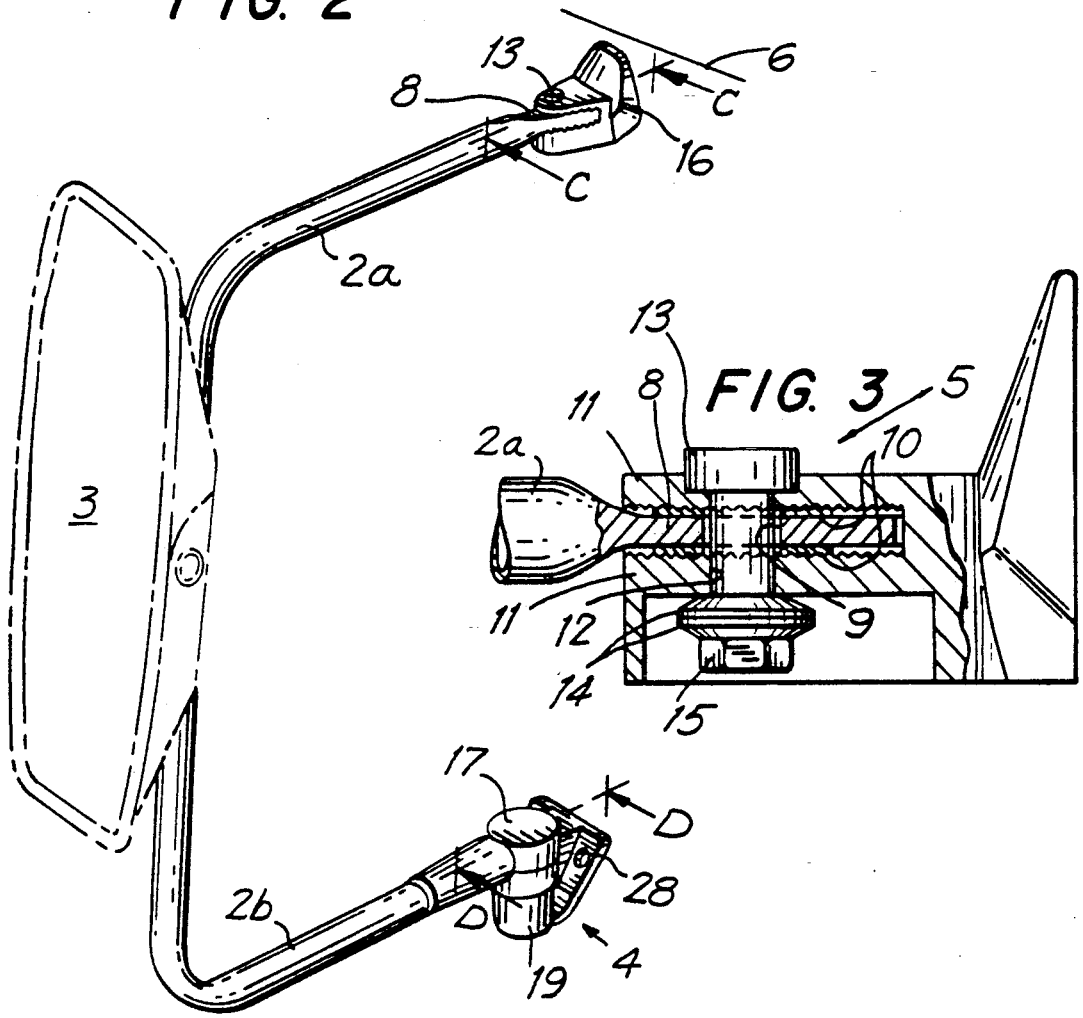

SUPPORT FOR AN EXTERNAL REARVIEW MIRROR FOR MOTOR VEHICLES

This is a continuation of application Ser. No. 550,146 filed Jul. 6, 1990 now abandoned.

BACKGROUND OF THE INVENTION

The invention relates to a support for an external reaview mirror for heavy vehicles such as buses, trucks and the like.

Generally, supports for external rearview mirrors for motor vehicles are widely known and used. However, the known conventional support does not have a sufficient stability against wind and vibrations. Also, they do not have appropriate means that would permit their easy adjustment by a vehicle driver.

SUMMARY OF THE INVENTION

The object of the invention is a support for an extnal rearview mirror which is stable against wind and vibration and is easily adjustable.

The object of the invention is achieved by providing a support for an external rear view mirror for motor vehicles which comprises a support rod having an intermediate vertical portion for supporting the mirror and upper and lower transverse portions extending substantially horizontally from opposite ends of the vertical portion. First and second base means are connected with respective free ends of the upper and lower transverse portions for attaching the support to a vehicle body. One of the first and second base means includes means for pivotally attaching a respective free end of one of the upper and lower transverse portions of the support rod to the one of the first and second base means. Another one of the first and second base means includes means for fixedly attaching a respective free end of another one of the upper and lower transverse portions of the support rod to the another one of the first and second base means. The free end of the one of the upper and lower transverse portions of the support rod has a flat end portion and the one of the first and second base means includes a base cantilever having spaced parallel sides for receiving the flat end portion therebetween and means for attaching the base cantilever to the vehicle body. Special means pivotally connects the flat end portion with the base cantilever. The pivotally connecting means comprises a pin member extending through respective superimposed openings in the sides and the flat end portion. The pin member has a threaded end portion projecting beyond a respective side of the base cantilever. A nut cooperates with the threaded end portion to secure the pin member to the base cantilever. Spring washer means is located between the nut and the respective side of the base cantilever.

Another one of the upper and lower transverse portions of the support rod has a cylindrical member and a pin projecting from an end face of the cylindrical member. The another one of the first and second base members includes a bushing member having an internal bore for receiving the pin member. A transverse pin extends through the pin member and cooperates with respective slot means in a crown for securing the pin member with the bushing member. Guide means is located in the internal bore in a spaced relationship with a transverse portion of the bushing member defining an opening through which the pin member extends. A helical spring extends between the guide means and the transverse portion of the bushing.

The pin member has a threaded end projecting through the guide sleeve. The another one of the first and second base means comprises a nut cooperating with the threaded end for securing the pin member to the guide means.

The present invention both as to its construction so to its method of operation, together with additional objects and advantages thereof, will be best understood from the following detailed description of specific embodiments when read in connection with the accompanying drawings.

BRIEF DESCRIPTION OF THE DRAWING

FIG. 2 shows a perspective view of an external rearview mirror support according to the invention;

FIG. 3 shows a partial cross-sectional view along line C—C in FIG. 2; and

FIG. 4 shows a partial cross-sectional view along line D—D in FIG. 2.

DETAILED DESCRIPTION OF THE PREFERRED EMBODIMENT

Figure 1:
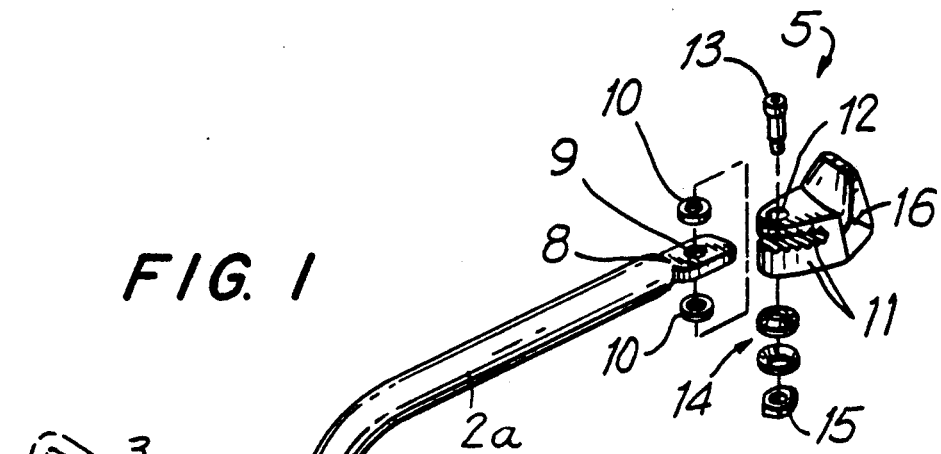
FIG. 1 shows an exploded view of an external rearview mirror support according to the invention.
Figure 1A:
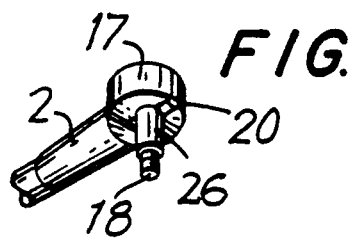
FIG. 1A shows the cylinder member of the C-shaped tubular support rod.
Figure 1B:
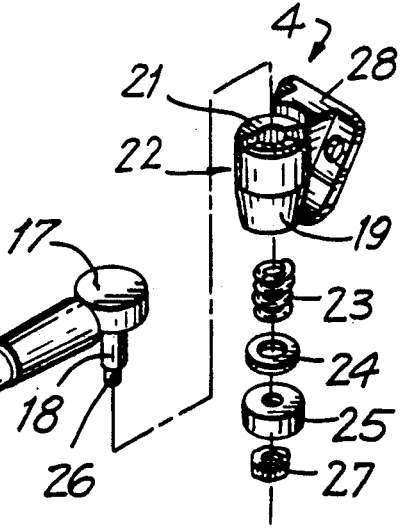
FIG. 1B shows the crown of the base member.

A support for an external rearview mirror according to the invention and shown in the attached drawings comprises an approximately C-shaped tubular support rod having an intermediate vertical portion 1 for supporting the mirror 3 and two transverse portions 2a and 2b extending substantially horizontally from opposite ends of the vertical portion 1. A bracket 7 serves for attaching the mirror 3 to the vertical portion 1.

The upper transverse portion 2a has at an end thereof a flat portion 8 with an opening 9 formed therein. The flat portion 8 is received between spaced parallel sides 11 of a base cantilever 5 attachable to a vehicle body. The sides 11 have openings 12 formed therein and which coincide with openings 9 in the flat portion 8 when the flat portion 8 is received between the sides 11. A pivot screw 13 extends through the openings 9 and 12 for pivotal attachment of the flat portion 8 to the base cantilever 5. The pivot screw 13 is secured to the base cantilever 5 with a set of spring washers 14 and a nut 15. Washers 10 separate the flat portion 8 from sides 11 of the base cantilever 5. The base cantilever 5 has a plate-like portion 16 for being secured to the vehicle body.

The free end of the lower transverse portion 2b is provided with a cylinder member 17 from a lower end face of which a pin 18 projects. The pin 18 is received in a cylindrical bushing 19 forming a part of a base member 4. A transverse pin 20 extends through the head portion of the pin 18. The transverse pin 20 is arranged in a respective slot of the crown 22 to regulate positions of the support. The pin 18 extends through adjacently arranged washer 24 and guide sleeve 25. A helical spring 23 extends between an inner surface of an upper transverse portion of the bushing 19 and the washer 24 supported in the bore of the bushing 19.

The foregoing arrangement for supporting the mirror support rod on the vehicle body insures easy adjustment thereof and rigid support of the mirror support rod in a predetermined adjusted position thereof.

While the invention has been illustrated and described as embodied in an external rearview mirror support for motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A support for an external rear view mirror for motor vehicles, comprising a support rod having an intermediate vertical portion for supporting the mirror and upper and lower transverse portions extending substantially horizontally from opposite ends of said vertical portion and having free ends; and first and second base means connected with respective free ends of said upper and lower transverse portions for attaching said support to a vehicle body, one of said first and second base means including means for pivotally attaching a respective free end of one of said upper and lower transverse portions of said support rod with said one of said first and second base means, and another one of said first and second base means including means for fixedly attaching a respective free end of another one of said upper and lower transverse portions of said support rod to said another one of said first and second base members; said another one of said upper and lower transverse portions of said support rod having a cylindrical head member at the free end thereof and a pin projecting from an end face of said cylindrical head member, said end face of said cylindrical head member having a slot formed therein, said another one of said first and second base members including a bushing member having an internal bore for receiving said pin, a transverse pin located in said slot of said end face of said cylindrical head member, extending through said pin and cooperating with respective slot means in a crown of said bushing member for securing said pin in said bushing member, guide means located in said internal bore in a spaced relationship with a transverse portion of said bushing member defining an opening through which said pin extends, and a helical spring extending between said guide means and said transverse portion of said bushing member, the free end of said one of said upper and lower transverse portions of said support rod having a flat end portion, said one of said first and second base means including a base cantilever having spaced parallel sides for receiving said flat end portion therebetween and means for attaching said base cantilever to the vehicle body, and means for pivotally connecting said flat end portion with said base cantilever, said pivotally connecting means comprising a pin member extending through respective superimposed openings in said sides and said flat end portion, and having a threaded end portion projecting beyond a respective side of said base cantilever, a nut cooperating with said threaded end portion to secure said pin member to said base cantilever, and spring washer means located between said nut and the respective side of said base cantilever.

2. A support as set forth in claim 1, wherein said pin member having a threaded end projecting through said guide sleeve, said another one of said first and second base means comprising a nut cooperating with said threaded end for securing said pin member to said guide means.

* * * * *